United States Patent
Ahlen et al.

(10) Patent No.: US 9,166,386 B2
(45) Date of Patent: Oct. 20, 2015

(54) SUBSEA CABLE REPAIR

(75) Inventors: Carl Henrik Ahlen, Trondheim (NO); Atle Børnes, Fyllingsdalen (NO); Even Tjåland, Bryne (NO); Kai Arne Kristiansen, Jonsvatnet (NO)

(73) Assignee: STATOIL PETROLEUM AS, Stavanger (NO)

( * ) Notice: Subject to any disclaimer, the term of this patent is extended or adjusted under 35 U.S.C. 154(b) by 80 days.

(21) Appl. No.: 14/007,271

(22) PCT Filed: Mar. 25, 2011

(86) PCT No.: PCT/EP2011/054643
§ 371 (c)(1),
(2), (4) Date: Nov. 8, 2013

(87) PCT Pub. No.: WO2012/130273
PCT Pub. Date: Oct. 4, 2012

(65) Prior Publication Data
US 2014/0056648 A1 Feb. 27, 2014

(51) Int. Cl.
| H02G 1/16 | (2006.01) |
| F16L 1/26 | (2006.01) |
| H02G 15/14 | (2006.01) |

(52) U.S. Cl.
CPC .. *H02G 1/16* (2013.01); *F16L 1/26* (2013.01); *H02G 15/14* (2013.01)

(58) Field of Classification Search
CPC .......... B63C 11/36; B63C 11/40; B63C 11/52
USPC ................................. 405/11, 184.1, 185, 192
See application file for complete search history.

(56) References Cited

U.S. PATENT DOCUMENTS

| 3,339,011 | A | * | 8/1967 | Ewers, Jr. et al. ................ 174/92 |
| 3,407,611 | A | * | 10/1968 | Coultrup ........................ 405/170 |
| 3,593,415 | A | | 7/1971 | Wofford |
| 3,706,206 | A | * | 12/1972 | Clark ............................. 405/185 |
| 3,879,953 | A | * | 4/1975 | Clark ........................... 405/195.1 |
| 4,133,180 | A | * | 1/1979 | Nobileau et al. .............. 405/170 |
| 4,171,175 | A | * | 10/1979 | Nobileau et al. .............. 405/170 |
| 4,288,176 | A | * | 9/1981 | Devine ......................... 405/188 |
| 4,362,437 | A | * | 12/1982 | Leary ........................... 405/188 |
| 4,479,690 | A | | 10/1984 | Inouye et al. |
| 4,626,128 | A | * | 12/1986 | Devine ........................... 405/12 |
| 2001/0005646 | A1 | | 6/2001 | Ness et al. |

FOREIGN PATENT DOCUMENTS

| CN | 200949707 Y | 9/2007 |
| EP | 1 381 117 A2 | 1/2004 |
| JP | 64-077409 A | 3/1989 |
| JP | 04-067711 A | 3/1992 |
| JP | 10-145955 A | 5/1998 |
| RU | 2 336 196 C1 | 10/2008 |
| WO | WO 86/03444 A1 | 6/1986 |
| WO | WO 2008/075322 A2 | 6/2008 |

* cited by examiner

*Primary Examiner* — Tara M. Pinnock
(74) *Attorney, Agent, or Firm* — Birch, Stewart, Kolasch & Birch, LLP

(57) ABSTRACT

There is provided subsea repair apparatus for performing repair of a subsea cable located beneath the sea, said apparatus comprising: an environment capsule capable of providing a substantially water-free environment within the capsule; and repair equipment located within the environment capsule arranged to repair said subsea cable without the need for a person to be located within the environment capsule.

31 Claims, 1 Drawing Sheet

SUBSEA CABLE REPAIR

FIELD OF THE INVENTION

The invention relates to the repair of subsea cables.

BACKGROUND OF THE INVENTION

Direct Electrical Heating (DEH) is a method for preventing wax and hydrates forming in subsea production pipelines of oil and gas. DEH is based on the fact that an electric alternating current (AC) in a metallic conductor generates heat in a single phase circuit, and DEH may be performed as follows. One cable is connected to the first end of the pipeline and a single core cable is piggybacked on (ie supported by) the pipeline and connected to the far end of the pipeline. The two cables together with the pipeline form a single phase electrical circuit. The single core piggyback cable is either strapped directly to the pipeline or located inside a mechanical protection profile which is strapped to the pipeline.

A traditional method for cable repair is to cut the cable subsea at the fault location, pull one end of the piggyback cable to the surface on a vessel and join the piggyback cable with an excess cable length stored on the vessel. The excess cable length is approximately 2.5 to 3 times water depth. The other end of the damaged cable is then pulled to the surface and dry spliced with the other end of the excess cable length. The piggyback cable is then re-installed on the pipeline with the excess cable length loop installed perpendicular to the pipeline. After electrical testing of the cable, the excess cable loop is rock dumped.

The following patent publications describe this existing technology:
EP1381117B1 (U.S. patent, filed 1982 Sep. 13, US NAVY)
U.S. Pat. No. 4,479,690 (European patent, filed 2003 Jul. 8, NEXANS)

There are some problems with the existing technology. With the current technology an excess length of 2.5 to 3 times the water depth is installed perpendicular to the pipeline and needs to be rock dumped. The pipeline also needs to be rock dumped in this area in order to avoid pipeline buckling. This is a time consuming operation with high cost. This operation requires a typical weather window of $H_s<3$ m in 24 hours.

For ultra deep water the excess cable length is up to 9 km which in some cases is longer than the length of the piggyback cable and pipeline. The total cost for a repair using existing technology can therefore be very high in ultra deep water.

In addition, the existing technology requires that the piggyback cable is able to carry its own weight at relevant water depth. This is not a challenge at 300-400 m water depth but for water depth in the area of 1000 m and deeper the copper conductor is not able to carry its own weight. This makes a repair scenario using existing technology very challenging.

The following documents also describe methods for repairing subsea cables. Chinese utility model CN 200949707Y (Shengli) describes a working cabin to allow maintenance of underwater cables without a surface boat. JP 4067711 (Hitachi) describes a capsule within which people may work underwater to cut a submarine cable. RU 2,336,196 (Uchrezhdenie) describes a compartment which allows personnel to work underwater. JP 10-145955 describes a container 102 filled with an insulating liquid 101 whose specific gravity is higher than water. Underwater cutting and connecting of cables 103 is performed in the liquid 101.

SUMMARY OF THE INVENTION

The invention provides a method and apparatus as set out in the accompanying claims.

Embodiments of the invention will now be described, by way of example only, with reference to the accompanying drawings.

DESCRIPTION OF PREFERRED EMBODIMENTS

We describe a method of performing cable joint activity by remote control subsea in a seawater free environment.

Figure 1:
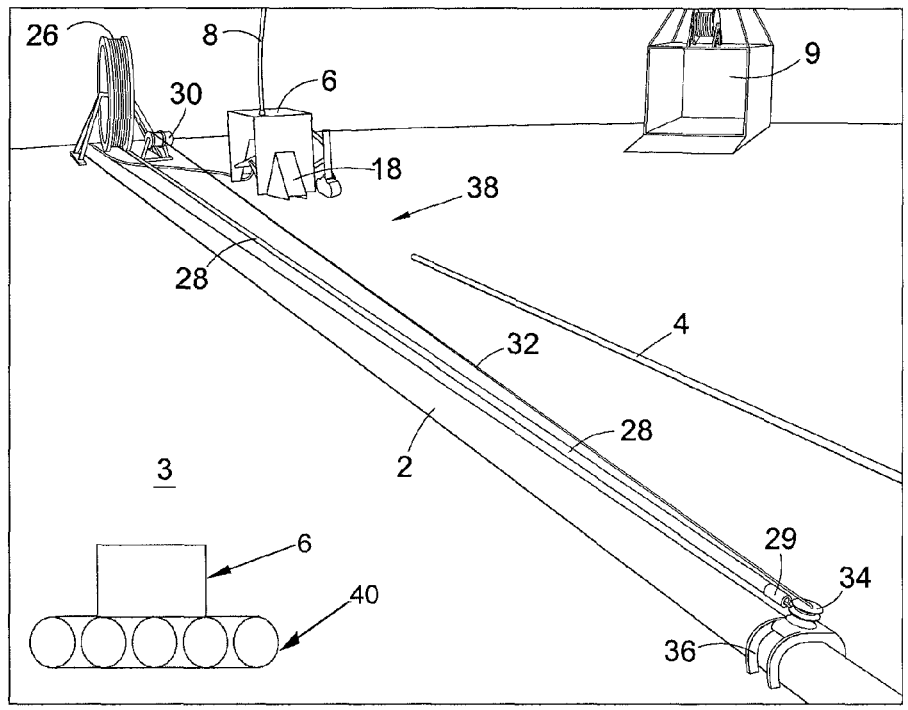
FIG. 1 is a perspective view showing an environment capsule deployed to repair a subsea cable; an FIG. 2 is a perspective view of the interior of the environment capsule.

FIG. 1 shows a pipeline 2 located on a seabed 3 and provided with a DEH cable 4. The DEH cable 4 is also known as a piggyback cable because in use it is secured along (ie piggybacked on) the pipeline 2. FIG. 1 shows a portion of the DEH cable 4 which has been released from the pipeline 2 in order to carry out a repair of the DEH/piggyback cable 4. A capsule 6 is lowered to the pipeline 2 by means of a support cable 8, which may be wound around a suitable winch (not shown) on a surface vessel (not shown). Alternatively the capsule 6 may be lowered to the seabed 3 in a container or basket 9, in which case an umbilical cord (not shown) may be provided between the basket 9 and the capsule 6 in order to provide electrical and/or hydraulic power and/or control signals to the capsule 6. The capsule 6 may be provided with continuous tracks (40) or other suitable means for allowing the capsule 6 to move around the seabed 3.

Figure 2:
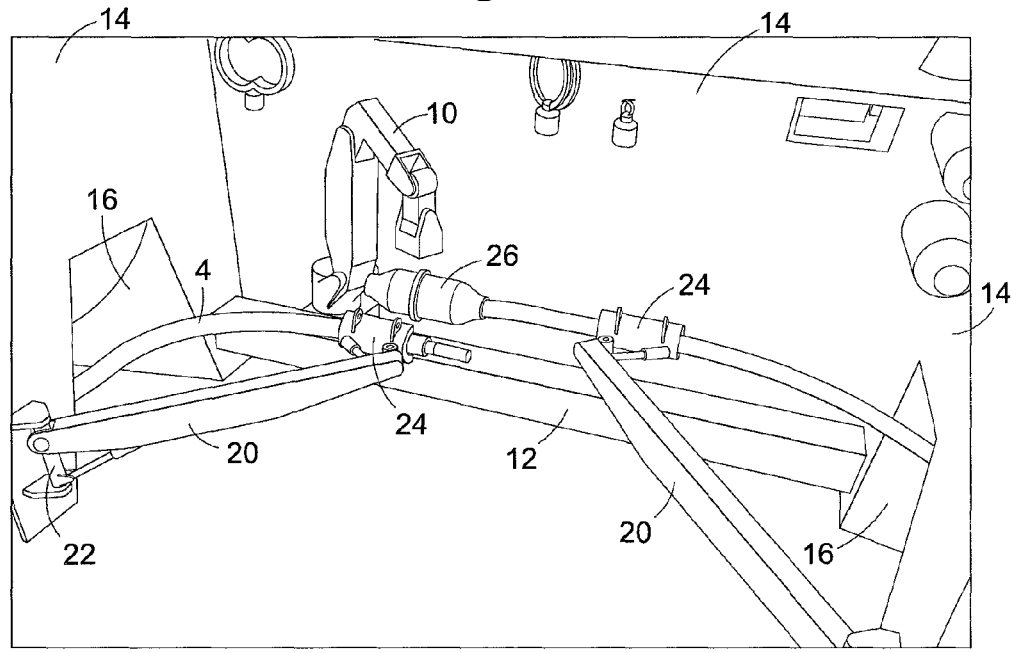

FIG. 2 shows the interior of the capsule 6, which provides a seawater free environment within which repair of the DEH cable 4 may be carried out. Within the capsule 6 there is provided a manipulator arm 10, which may be a marinised robot or manipulator arm 10 or a remotely operated vehicle (ROV) arm or similar, supported by a support rail 12 which is fixed to opposite sides of the capsule 6. More than one such arm 10 may be provided if necessary.

In this embodiment the capsule 6 is substantially rectangular in shape, and has four side walls 14 (three of which are visible in FIG. 2) arranged as two orthogonal pairs. Two opposite side walls 14 are provided with shaped openings 16 which are arranged to accommodate the cable 4 when the cable 4 is lifted by ROV arm 10 into the water-free environment within the capsule 6. Each opening 16 is formed by a skirt portion 18, wherein the skirt portion 18 is formed from a portion of its respective side wall 14, and wherein the bottom edge of the skirt portion 18 follows a line which is at substantially the same height as the bottom of the side walls 14, thus ensuring that water does not enter the interior of the capsule 6 via the openings 16.

Two support arms 20 are each pivotally mounted, each about a vertical axis, to respective side walls 14 by hinges 22 (one of which is visible in FIG. 2). Each support arm 20 is provided, at the opposite end to hinge 22, with a cable holder 24, into which the cable 4 can be placed by the remotely controlled arm 10. Each cable holder 24 is generally cup-shaped, or of generally semi-cylindrical shape, so that it can receive and hold the cable 4.

The environment within the capsule 6 is open at the bottom part (floor), but keeps the water out by filling the environment with gas or liquid which equalizes the water pressure as the environment is lowered from a surface vessel (not shown) to the seabed. The gas or liquid preferably has lower electrical conductivity than seawater, and preferably has an electrical conductivity of less than 0.1 Siemens per meter (0.1 S/m) at 20 degrees centigrade. Alternatively the gas or liquid may have an electrical conductivity of less than 0.2 Siemens per meter or less than 0.05 Siemens per meter. All the cable cutting, cable end preparation and cable splicing activities are performed by the remotely controlled ROV arm 10 in the seawater free environment subsea.

Typical steps in the method of repairing a DEH/piggyback cable 4 are as follows:

Damage to piggyback cable 4 is located by traditional test equipment and/or by a ROV. The water-free environment within capsule 6, with all equipment including cable joint, is lowered from a vessel (not shown) to a position close to the pipeline 2 where damage to piggyback cable 4 is located.

A cable drum 26 with approximately 50 to 100 m of repair cable 28 is lowered close to the environment capsule 6. Each end of the repair cable 28 can be prepared for jointing on the surface vessel prior to being lowered to the seabed 3. The end of the repair cable 28 is provided with a heat shrink cap 29 to protect against water ingress. In FIG. 1 a winch 30 is provided for pulling the repair cable 28 along the pipeline 2 by means of a wire 32 which passes through a running block 34. The running block 34 is attached to the pipeline 2 by means of a clamp 36. Although it can be convenient to pull the repair cable 28 along the pipeline 2 in this manner, the repair cable 28 must then be positioned in a gap 38 (described below) in the DEH cable 4 in order to effect the repair of the DEH cable.

Straps (not shown) which fix the piggyback cable 4 to the pipeline 2 are cut by a separate ROV at a distance of up to 50 m on each side of the piggyback cable damage. As an alternative, the remotely controlled arm 10 within the capsule 6 may be used. This allows a portion of the piggyback cable 4 to be separated from the pipeline 2 as shown in FIG. 1.

The piggyback cable 4 is cut at a fault location and relocated parallel to the pipeline 2, as shown in FIG. 1.

The environment capsule 6 is located above the piggyback cable 4 and the piggyback cable 4 is picked up by remotely operated manipulator arm 10 and fastened in holders 24 in the seawater-free area of the environment, as shown in FIG. 2.

The first end of the repair cable 28 from the drum 26 is guided into the seawater free area of the environment capsule 6.

The piggyback cable 4 is cut approximately 10 to 50 m from the fault location in order to remove a length of cable 4 where water may be trapped inside the conductor. This creates a gap 38 in the piggyback cable 4.

The cable's outer sheath is thoroughly cleaned in order to avoid any contaminations. A cable joint body 26 is threaded onto the piggyback cable prior to cable preparation and protected against contaminants. Cable end preparations start by removing outer sheath and preparing insulation system according to cable joint requirements. Several video cameras (not shown) installed inside the environment capsule 6 continuously monitor the cable preparation work in order to make sure the work is done according to requirements.

A connector/sleeve (not shown) located inside the joint body 26 is installed/clamped on the cable conductors thereby mechanically and electrically connecting the conductors.

The cable ends at the joint area are thoroughly cleaned for any contaminations before a joint body is guided onto the cables splice area at the correct position. A protection sheath (not shown) is installed over the joint body and cable sheath for sealing purposes.

Once the repair is complete the gap 38 in the DEH/piggyback cable 4 is filled by a portion of the repair cable 28 which replaces the removed portion of the DEH/piggyback cable 4. The capsule 6 and winch 26 can then be removed. A loop may be left in the repair cable 28 to ensure that very little tension is applied to the cable splices during operation, and particularly in the case of any expansion of the pipeline 2.

The embodiment described allows cable repair in a seawater free pressurized environment located on the seabed. Cable cutting, preparation and joining are performed by remote control in a substantially water-free environment located on the seabed. Various types of cable can be repaired, including umbilical cables.

Some advantages of the described system are listed below:
No excess cable length installed perpendicular to pipeline.
No need to have long spare cable lengths stored for repair scenario.
No rock dumping of excess cable loop is required.
No water depth limitations as is the case for standard copper cable (which is required to carry its own weight as described above). For water depths greater than about 1000 m traditional repair technology is not considered feasible.
Cost and time efficient cable repair.
Repair operation is less sensitive to weather/sea conditions.
Excess cable length of 2.5 to 3 times water depth is not needed.
A feasible method for cable repair in ultra deep water is provided (not limited by mechanical characteristics of the copper conductor).
Cable joint operations are performed in a pressurized environment with the advantage that the splice is exposed to minimal differential pressure from preparation mode to operation mode.

It will be appreciated that repair of cable 4 is carried out without the need for a person to be present within the capsule 6. The arm 10 may be remotely controlled by an operator who is located outside of capsule 6, for example on a surface vessel (not shown). However, other embodiments are possible in which the arm 10 is automated or at least partly automated so that not all of the repair steps need to be controlled by the remote operator.

The capsule 6 may be provided with continuous tracks (40) or other driving means, for moving the capsule around on the seabed 3, either autonomously or under the control of a remote operator.

The capsule 6 may be provided with one or more umbilical cords, either from the basket/container 9 or directly from a surface vessel (as in the case of cord 8 in FIG. 1). The umbilical cord or cords may provide electrical and/or hydraulic power to the capsule 6, control signals for the repair apparatus within the capsule 6 such as the arm 10, and/or low conductivity gas or liquid for filling the capsule 6. After the repair the low conductivity gas or liquid may be removed from the capsule 6 via an umbilical cord.

The invention claimed is:

1. A method of repairing a damaged portion of a subsea cable located beneath a sea, which comprises:
   identifying a damaged portion of the subsea cable;
   providing a substantially water-free environment around said damaged portion of the subsea cable;
   repairing said damaged portion of the subsea cable within said substantially water-free environment; and
   removing said substantially water-free environment from the subsea cable,
   wherein said repair step is carried out by repair equipment within said substantially water-free environment without the need for a person to be located within said water-free environment during said repair step, and wherein said repair equipment includes at least one selected from remotely controlled equipment, automated equipment, and at least partly automated equipment.

2. The method as claimed in claim 1, which further comprises monitoring said repair step by means of at least one video camera located within said water-free environment.

3. The method as claimed in claim 1, wherein
when said repair equipment is automated, or at least partly automated, said repair equipment performs at least some steps in the repair of the subsea cable without direct control by a human operator.

4. The method as claimed in claim 1, wherein said subsea cable is attached to an oil or gas pipeline before said repair step, and said repair step includes removing at least a portion of said subsea cable from said oil or gas pipeline.

5. The method as claimed in claim 1, wherein said subsea cable is a direct electrical heating cable of a subsea oil or gas pipeline.

6. The method as claimed in claim 1, wherein said step of repairing the subsea cable includes cutting the subsea cable.

7. The method as claimed in claim 6, which further comprises, after cutting said subsea cable, removing part of the subsea cable which contains sea water.

8. The method as claimed in claim 7, which further comprises, lowering to the seabed, or at least to a location close to the subsea cable, a repair cable for use in repairing said subsea cable.

9. The method as claimed in claim 8, which further comprises connecting or splicing said repair cable to a cut end of said subsea cable in order to form an electrical connection between said repair cable and said subsea cable.

10. The method as claimed in claim 1, wherein said step of providing a substantially water-free environment includes:
providing an environment capsule which contains a gas or liquid which provides said substantially water-free environment.

11. The method as claimed in claim 10, which further comprises lowering said environment capsule to the seabed, or at least to a location close to the subsea cable.

12. The method as claimed in claim 10, which further comprises moving said environment capsule along the seabed by means of drive means provided on the environment capsule.

13. The method as claimed in claim 10, wherein said gas or liquid has an electrical conductivity lower than that of seawater.

14. The method as claimed in claim 13, wherein said gas or liquid has an electrical conductivity of less than 0.1 Siemens per meter at 20 degrees centigrade.

15. The method as claimed in claim 10, where said step of repairing the subsea cable includes positioning said environment capsule over said damaged portion of the subsea cable.

16. The method as claimed in claim 10, wherein said step of repairing the subsea cable includes lifting said damaged portion of the subsea cable into the substantially water-free environment within said environment capsule.

17. The method as claimed in claim 10, which further comprises removing at least some of said gas or liquid from said environment capsule via an umbilical cord after said repairing step.

18. A subsea repair apparatus for performing repair of a subsea cable located beneath the sea, said apparatus comprising:
an environment capsule capable of providing a substantially water-free environment within the capsule; and
repair equipment located within the environment capsule arranged to repair the subsea cable without the need for a person to be located within the environment capsule,
wherein said repair equipment includes at least one selected from remotely controlled equipment, automated equipment, and at least partly automated equipment.

19. The apparatus as claimed in claim 18, wherein
said environment capsule has an opening on its lower side, said opening being arranged to be open to the sea, and to face the seabed, during use.

20. The apparatus as claimed in claim 18, wherein
said repair equipment comprises a controllable arm which is arranged to be remotely controlled by an operator located outside of said environment capsule.

21. The apparatus as claimed in claim 20, wherein said arm is electrically and/or hydraulically actuated.

22. The apparatus as claimed in claim 18, wherein said environment capsule is filled with a gas or liquid having an electrical conductivity lower than that of seawater.

23. The apparatus as claimed in claim 18, wherein said gas or liquid has an electrical conductivity of less than 0.1 Siemens per meter at 20 degrees centigrade.

24. The apparatus as claimed in claim 22, which further comprises an umbilical cord for supplying said gas or liquid to, or removing said gas or liquid from, said environment capsule.

25. The apparatus as claimed in claim 18, which further comprises at least one support arm hingedly connected to a wall of said environment capsule, said support arm being adapted to receive and hold a cable.

26. The apparatus as claimed in claim 18, wherein said environment capsule comprises a side wall having an opening defined by a skirt portion of said side wall, wherein the bottom of the skirt portion and the bottom of the side wall both follow paths which lie generally within a single plane.

27. The apparatus as claimed in claim 18, which further comprises drive means for driving said environment capsule along a seabed.

28. The apparatus as claimed in claim 27, wherein said drive means comprises continuous tracks.

29. The apparatus as claimed in claim 18, which further comprises at least one video camera located within said environment capsule for monitoring repair of the subsea cable.

30. The apparatus as claimed in claim 18, which further comprises an umbilical cord for providing electrical and/or hydraulic power to said environment capsule.

31. The apparatus as claimed in claim 18, which further comprises an umbilical cord for providing control signals to said repair equipment located within said environment capsule.

* * * * *